United States Patent [19]
Park et al.

[11] Patent Number: 5,526,331
[45] Date of Patent: Jun. 11, 1996

[54] METHOD FOR RECORDING ADDITIONAL INFORMATION ON AN OPTICAL DISC

[75] Inventors: Tae-seok Park, Suwon; Seung-tae Jung; Jung-hoe Kim, both of Seoul, all of Rep. of Korea

[73] Assignee: Samsung Electronics Co., Ltd., Kyungki-do, Rep. of Korea

[21] Appl. No.: 393,887

[22] Filed: Feb. 22, 1995

Related U.S. Application Data

[62] Division of Ser. No. 998,905, Dec. 30, 1992, abandoned.

[30] Foreign Application Priority Data

Jun. 30, 1992 [KR] Rep. of Korea ................. 92-11634

[51] Int. Cl.$^6$ ..................................................... G11B 7/00
[52] U.S. Cl. ........................... 369/47; 369/54; 369/58; 369/84
[58] Field of Search ..................... 369/47–50, 53–54, 369/83–84, 116, 32, 58, 111, 124; 360/15, 14.1–14.3

[56] References Cited

U.S. PATENT DOCUMENTS

| | | | |
|---|---|---|---|
| 4,410,917 | 10/1983 | Newdoll et al. | 360/15 |
| 4,481,615 | 11/1984 | Hioki | 369/50 |
| 4,733,386 | 3/1988 | Shimoi | 369/47 X |
| 4,827,357 | 5/1989 | Kawakami | 360/15 X |
| 4,977,550 | 12/1990 | Furuya et al. | 369/50 X |
| 5,027,232 | 6/1991 | Sekii et al. | 360/15 X |
| 5,040,076 | 8/1991 | Tenma | 369/50 X |
| 5,109,369 | 4/1992 | Maeda et al. | 369/47 X |
| 5,177,619 | 1/1993 | Sato | 360/15 |
| 5,194,963 | 3/1993 | Dunlap et al. | 369/84 X |
| 5,243,476 | 9/1993 | Hong | 360/15 X |
| 5,295,126 | 3/1994 | Okano et al. | 369/47 |
| 5,341,356 | 8/1994 | Dieleman et al. | 369/47 |

*Primary Examiner*—W. R. Young
*Attorney, Agent, or Firm*—Rothwell, Figg, Ernst & Kurz

[57] ABSTRACT

A dual disc recording/reproducing apparatus and recording method. The apparatus includes a reproducing deck unit and a recording/reproducing deck unit with both being controlled by one control unit. The method comprises the steps of recording on a disc a first program and a disc playing time on the lead-in area thereof unless data is recorded on the disc, recording the data onto the next recording area of the lead-out area if data is already recorded on the disc, and then recording the lead-out to process a present lead-out area as a bad block area. The next step is recording a new lead-out at the end of the disc playing time, and then processing the previous and next blocks, including the present lead-out area, as a bad block during the recording of the data, processing the previous and next blocks, including the lead-in area, as a bad block, and then recording the data in the program memory area onto a new lead-in area.

3 Claims, 4 Drawing Sheets

RECORDING TWICE ON THE OPTICAL DISC

RECORDING

METHOD FOR RECORDING ADDITIONAL INFORMATION ON AN OPTICAL DISC

This is a divisional of application Ser. No. 07/998,905, filed Dec. 30, 1992, abandoned.

BACKGROUND OF THE INVENTION

The present invention relates generally to a recording apparatus and method for converting an audio signal into a digital signal and then recording the converted signal onto an optical disc in a predetermined format, and more particularly to a dual compact disc recording/reproducing apparatus comprising two decks (one for general compact-disc playing and the other for optical-disc recording.) The apparatus can record an externally input audio signal and a compact disc's audio signal onto an ordinary optical disc or compact disk (CD) of an optical disc recording apparatus, with the recorded optical disc being compatible with another compact disc player.

Recently, as the use of CDs becomes widespread due to their superior sound quality, interest in CD players (CDPs) or optical disc apparatus for audio recording has increased.

However, since currently used CDPs and optical disc apparatus for audio recording are separate units, it is necessary to externally interface the separate units in order to record or compile the signal of a compact disc onto an optical disc. Also, in order to select and record only a certain portion of the contents of the compact disc, a third controlling apparatus, such as a computer, is required to simultaneously control both the CDP and the optical disc apparatus. Additionally, certain criteria and standards for recording should be met so that the method for recording a signal on an optical disc accords with that of a compact disc player, thus permitting one to play or reproduce the signal recorded on the optical disc from any CDP after recording.

Accordingly, since special skill is required to install such equipment and perform the recording, the average consumer cannot make use of such an apparatus. Moreover, the apparatus is prohibitively expensive. Furthermore, referring to the structure of the compact disc, information as to the number of program Files (songs) recorded on the disc, the playing time of each program File, the entire playing time, address indexes thereof, etc. is recorded on a lead-in area, while the signal indicating the end of the program file is recorded on a lead-out area.

Accordingly, an optical disc in which the signals are not recorded in the above format cannot be played in a CDP. When using an optical disc on which only a single recording operation can be performed, once recording is initiated, lead-out information indicating the end of recording is recorded on the outermost recording area, and lead-in information including the recording time and other information is recorded on the innermost recording area. Therefore, the entire desired contents should be recorded during one continuous recording operation. As a result, it is impossible to partially record on the optical disc, play the disc on a compact disc player, and then record further.

In order to solve such disadvantages, it is possible to use a rewritable optical disc on which the lead-in and lead-out signals can be altered so as to be recorded per each recording, after which the disc can be played in a CDP. However, duplicating the contents (i.e., data, programs, songs, etc.) of the compact disc using such a rewritable optical disc is illegal, so the disc cannot be used regardless of the technical ease with which it allows recording. Also, the structure of such an optical disc and the recording apparatus used therewith are complicated, thus increasing manufacturing costs.

SUMMARY OF THE INVENTION

One object of the present invention is to provide a dual disc recording/reproducing apparatus that can control recording on an optical disc which typically can be recorded on only once with the same equipment used to record and reproduce the compact disc signal.

Another object of the present invention is to provide a method for recording data in a dual disc recording/reproducing apparatus, which can partially record the data on an optical disc.

To achieve the above objects there is provided, according to one aspect of the present invention, a dual disc recording/reproducing apparatus which includes a reproducing deck unit for reading out data from a reproducing disc and a recording/reproducing deck unit for reading out data from a recording/reproducing disc and recording externally supplied data onto the recording/reproducing disc.

A signal decoding/outputting unit is provided for selectively receiving the data read out from either the reproducing deck or the recording/reproducing deck according to a deck-selecting signal, and then signal-processing the inputted data to output an audio signal and a synchronizing signal. Also provided is a signal inputting/encoding unit for selectively receiving the audio signal of either the signal decoding/outputting unit or an externally supplied audio signal according to a signal-selecting signal, and then encoding the selectively input signal into recording data to supplied to the recording/reproducing deck unit.

A first servo-controlling unit is provided for receiving synchronous signals and then controlling the servo of the reproducing deck unit, and a second servo-controlling unit is provided for receiving synchronizing signals and controlling the playback servo of the recording/reproducing deck unit during reproducing, while receiving the synchronizing signal detected from the tracking error signal of a pickup unit and controlling the record servo during recording. A microcomputer is used for generating the deck-selecting signal and the signal-selecting signal, as well as for controlling each of the units.

To achieve the above objects there is provided, according to another aspect of the present invention, a method for recording a signal onto a disc with a dual disc recording/reproducing apparatus, wherein the disc has a program memory area, a lead-in area, a data area and a lead-out area. The method includes the steps of recording a first program and a maximum disc playing time on the lead-in area unless the data is recorded on the disc, recording the data onto the next recording region of the lead-out area if data is already recorded on the disc, and then recording the lead-out to process a present lead-out area as a bad block area, recording a new lead-out at the end of the maximum disc playing time if data has not been recorded on the disc, and then processing the previous and next blocks including the present lead-out area as a bad block during the recording of the data, processing the previous and next blocks including the lead-in area as a bad block, and then recording the data in the program memory area onto a new lead-in area.

Further features and advantages will become more apparent from the following and more particular description of the preferred embodiment of the invention as illustrated in the accompanying drawings in which the same reference characters generally refer to like parts throughout the views, and in which:

DETAILED DESCRIPTION OF THE INVENTION

Figure 1B:
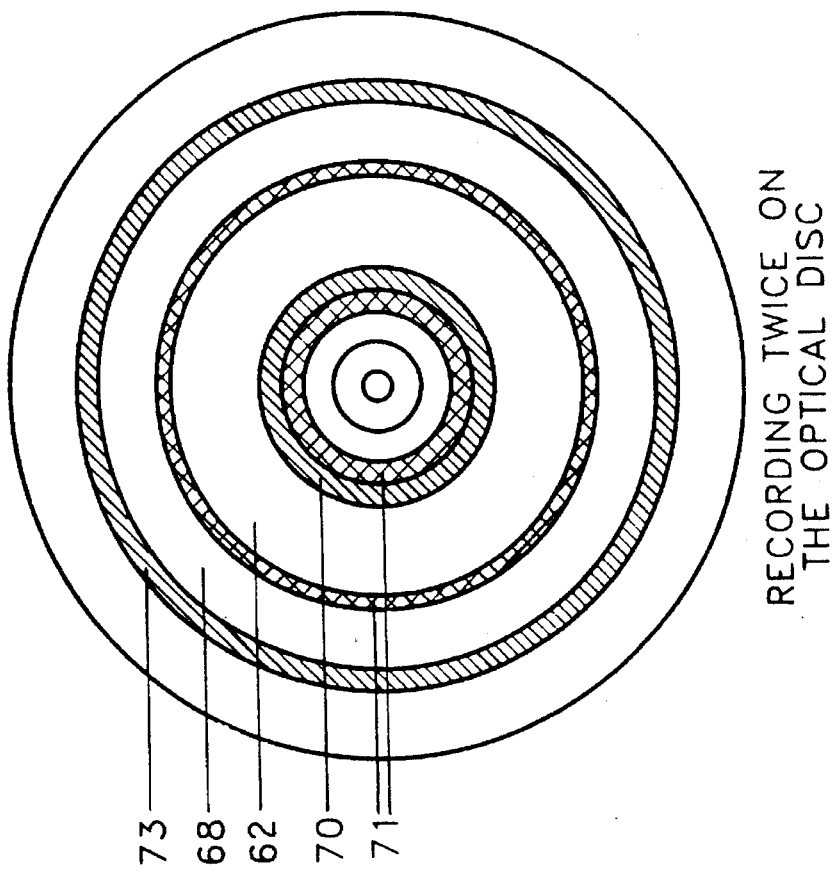
FIGS. 1A and 1B show a compact disk format with a signal recorded thereon according to the present invention.
Figure 1A:
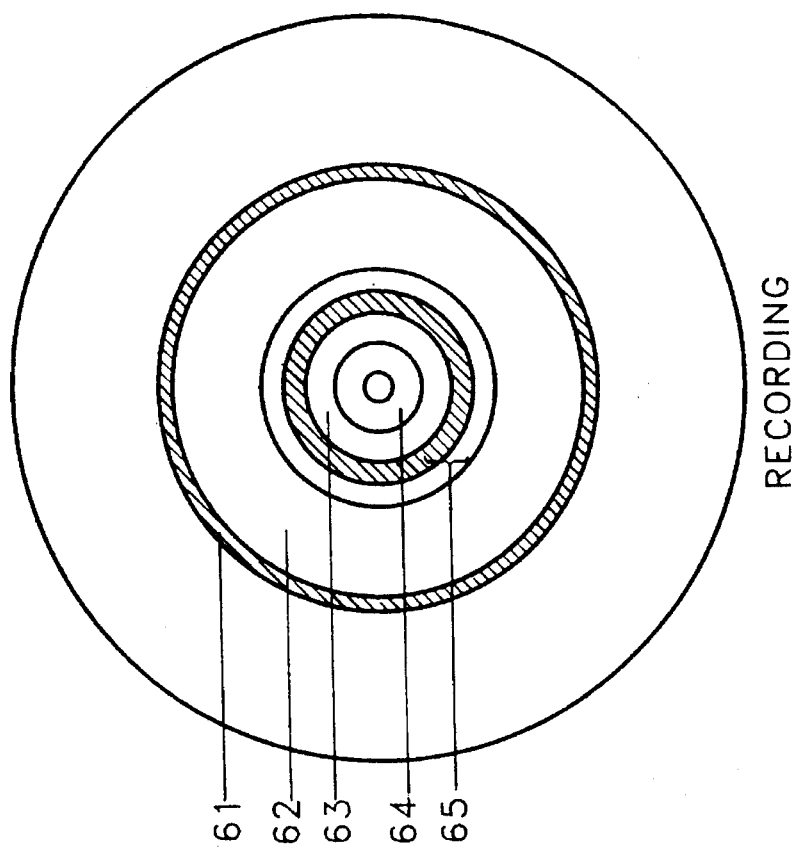

Referring to FIG. 1A, a signal is recorded on a compact disc that is capable of being recorded on only once, wherein the disc has formed therein, in sequence from the disc center to the outer edge, a center hole, a clamp area 64 for clamping the disc from the bottom, a program memory area (hereinafter referred to as PMA) 63, a lead-in area 65, a data recording area 62 and a lead-out area 61. The number of programs recorded on the disc and variable lead-in information are recorded on lead-in area 65, while the lead-out area 61 has recorded thereon a signal indicating the end of the program.

FIG. 1B shows how new data can be continuously recorded on a disc that typically is capable of being recorded on only once, and how a part of a signal can be recorded. The lead-in and lead-out areas 65 and 61 as shown in FIG. 1A are processed as bad blocks 71, new data is then recorded on area 68 disposed outward of the lead-out area 61 shown in FIG. 1A, and new information as to the data is then recorded on new lead-in and lead-out areas 70 and 73. Accordingly, multiple data recording operations are possible, and thus more disc area can be used to process more data.

Figure 2:
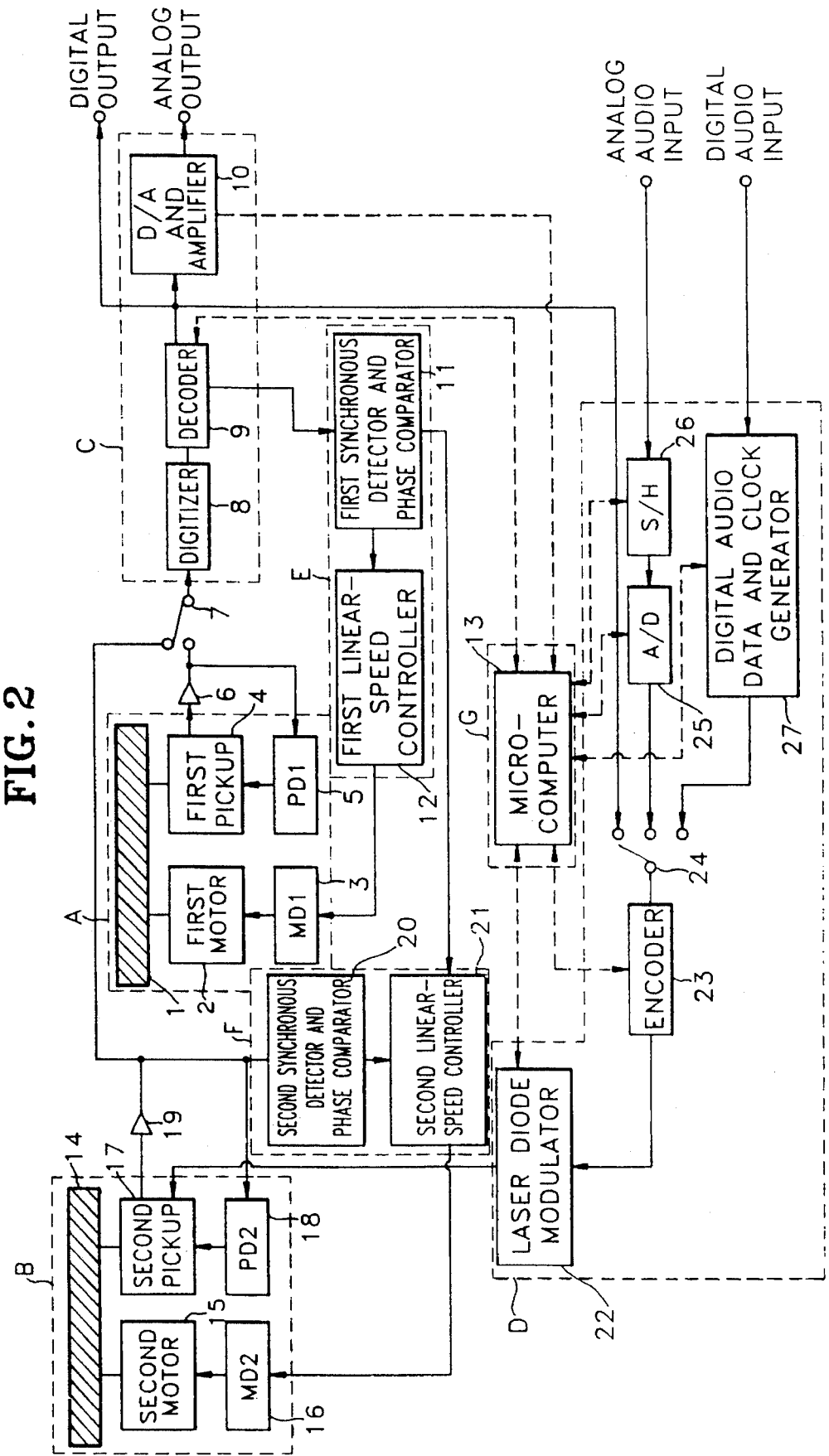
FIG. 2 shows a circuit schematic of the dual compact disc recording apparatus according to the present invention.

FIG.2 shows the constitution of a dual compact disc recording apparatus according to the present invention. The dual disc recording/reproducing apparatus includes a playback or reproducing deck unit A, a recording/reproducing deck unit B, a signal decoding/outputting unit C, a signal inputting/encoding unit D, a first servo controlling unit E, a second servo controlling unit F, and a microcomputer G.

Reproducing deck unit A is for reading data from a reproducing disc 1 and comprises a first motor 2 for rotating the reproducing disc 1 having the data recorded thereon, a first motor driver 3, a first pickup 4 for performing focusing and tracking and then reading of the recorded data, and a first pickup moving unit 5.

Recording/reproducing deck unit B is for reading data from recording/reproducing disc 14, and then recording externally supplied data onto the recording/reproducing disc 14. The deck unit B comprises a second motor 15 for rotating the recording/reproducing disc 14, a second motor driver 16, a second pickup 17 for performing focusing and tracking and then reading of the recorded data, and a second pickup moving unit 18.

Signal decoding/outputting unit C selectively receives the input data read from either reproducing deck unit A or recording/reproducing deck unit B according to a deck-selecting signal, and then signal-processes the input data to output an audio signal and a synchronizing signal. The unit C comprises a digitizer 8 for shaping the waveform of the reproducing signal, a decoder 9 for separating a control signal and data from the recorded signal and then error correcting, and a D/A converting and amplifying unit 10 for converting a digital signal into an analog signal and then amplifying the analog signal.

Signal inputting/encoding unit D selectively receives the audio signal of either signal decoding/outputting unit C or an externally supplied audio signal according to a signal-selecting signal, and then encodes the same into recording data to supply the selectively input signal to recording/reproducing deck unit B. The unit D comprises a laser modulator 22 for controlling the output of a laser diode (not shown) during recording and reproducing, an A/D converter 25 for converting an analog signal into a digital signal, and a sampling hold unit 26 for sampling an externally supplied analog signal during recording. The unit D further includes a digital audio data and clock generator 27 for generating digital audio data and a clock to control an externally supplied digital signal so as to be compatible with a compact disc format, and an encoder 23 for adding an error code and a control signal to a signal to be recorded.

First servo-controlling unit E receives a first synchronizing signal from decoder 9 and then controls the servo of reproducing deck unit A. The unit E comprises a first synchronous detector and phase comparator 11 to control the rotating speed of the disc during reproducing or playing, and a first linear speed controller 12 for controlling the linear speed of first motor driving unit 3.

Second servo-controlling unit F receives a first synchronizing signal from decoder 9 and controls the playback servo of recording/reproducing deck unit B during reproducing, and receives a second synchronizing signal detected from the tracking error signal of pickup unit 17 and controls the record servo during recording. The unit F comprises a second synchronous detector and phase comparator 20 for detecting the second synchronizing signal and comparing the phases which detects a from the tracking error signal during recording and compares the phases, and a second linear speed controller 21 which receives control signals from first synchronous detector and phase comparator 11 for controlling the linear speed of second motor driving unit 16. Here, digitizer 8, decoder 9, and D/A converting and amplifying unit 10 are preferably shared by the reproducing deck unit A and recording/reproducing deck unit B, to simplify system construction.

In a conventional CD-WORM (write once read many) drive, unless data is sequentially recorded on a disc, it is impossible to reproduce the signal with a general CDP. In the present invention, however, it is possible to record on a portion of the disc, then play the recorded portion on a general CDP, and then utilize the remaining recording areas for further recording. The microcomputer G generates the deck-selecting signal and the signal-selecting signal, and controls each of the units.

The dual disc recording/reproducing apparatus described above is operated as follows. During reproduction, reproducing deck unit A is operated according to the reproducing method of a conventional CDP. After the pickup unit is moved toward the innermost diameter of the disc, the disc is rotated using first disc rotating motor 2 and first motor driving unit 3 to read out the data in the lead-in area, and microcomputer 13 the controls the position of the pickup unit to the location of the desired program 13 in reference with the data read from the lead-in area.

The process for constantly controlling the linear speed of the disc is performed in such a manner that a control signal, a synchronizing signal and data are separated from the shaped signal of decoder 9 via digitizer 8, wherein the control signal is transferred to microcomputer 13 to control the entire system and the synchronizing signal is used as data to maintain the rotating speed at 1.25 m/s or to make the synchronizing signal 7.35 KHz. A first switch 7 supplies the output of a first pre-amp 6 to digitizer 8.

The audio data in the output of decoder 9 is converted to an analog audio output via D/A converting and amplifying unit 10, and is transferred to a speaker (not shown). The digital output is the direct the output of the decoder. During the reproducing operation of the deck unit A, the operation of the circuits designated by reference numbers 15 through 27 (related to recording/reproducing) is paused. Also, the pickup movement of deck unit A is performed in pickup driving unit 5 using the tracking signal among the output of first pre-amp 6.

When reproducing with recording/reproducing deck unit B, the disc 14 is rotated to extract a signal by means of second disc motor 15, second motor driving unit 16, second pickup unit 17, second pickup moving unit 18 and second pre-amp 19. Here, the output of the laser diode is controlled in laser modulator 22 to a predetermined output level suitable for reproduction.

The reproduced signal from second pre-amp 19 is sent to digitizer 8, part of the reproducing deck unit A, via first switch 7. The synchronizing signal from decoder 9 is sent to first synchronous detector and phase comparator 11, which sends the resultant signal to second linear speed controller 21 of the recording/reproducing deck unit B to maintain a linear rotating speed of the disc. Here, the operation of the circuit components designated by reference numbers 1–6 and 23–27 is paused. The pickup movement of the recording/reproducing deck unit B is performed in second pickup moving unit 18 using the tracking signal from the output of second pre-amp 19.

When recording an externally supplied signal, since a recording/reproducing disc can be recorded on only once, the externally supplied signal is recorded on the disc according to a predetermined format. Since system operation differs depending on whether or not data has been previously recorded on the recording/reproducing disc, only the signal flow will be explained as follows.

If the externally supplied signal is in analog form, it is sampled at 44.1 KHz in sampling hold unit 26, and digitized in A/D converter 25 to be sent to encoder 23. As shown in FIG. 2, a second switch 24 is connected to the output of A/D converter 25.

If the externally supplied signal is in digital form, it is sent to digital audio data and clock generator 27 to become compatible with a predetermined signal recording format, and is then transferred to encoder 23 by second switch 24. The output of encoder 23 is used by laser diode modulator 22 to modulate a laser diode output signal in a manner suitable for recording on the disc, which then is sent to the laser diode of second pickup 17 to perform recording. In addition, the digital output of A/D converter 25 or digital audio clock signal generator 27 is transferred from second switch 24 to D/A converting and amplifying unit 10 and then output to the speaker.

The control of the rotating speed of the disc 14 during recording is performed in such a manner that a control signal is created in second synchronous detecting and phase comparing unit 20 and second linear speed controller 21 using a 7.35 KHz synchronizing signal included in the tracking error signal from second pickup unit 17. Second motor 15 is then driven by second motor driver 16 according to the control signal.

When recording a reproduced CDP signal from reproducing deck unit A, the signal from a reproducing CD 1 is recorded on a recording/reproducing disc 14 in such a manner that the signal of the reproducing CD is extracted by first pickup 4 and first switch 7 is selected to send the signal to digitizer 8 via first pre-amp 6. Decoder 9 separates the output of digitizer 8 into a synchronizing signal, a control signal and 9 data signal. The synchronizing signal is used to control first synchronous detector and phase comparator 11, first linear speed controller 12, first motor driver 3 and first motor 2, while the data is transferred to encoder 23 via switch 24 and at the same time is output to the speaker via D/A converting and amplifying unit 10.

The linear speed of the recording/reproducing deck during recording is controlled in such a manner that after a 7.35 KHz synchronizing signal is detected in second synchronous detector 20 from the tracking error signal from second pickup 17, the linear-speed-controlling signal is sent from second linear speed controller 21 to second motor driver 16, and the output of encoder 23 is recorded via laser diode modulator 22 and second pickup 17 by the aforementioned method. Since the number of reproduced programs and the position of the programs in the recording area may be different, the number of programs is set in microcomputer 13 depending on the presence and absence of data in a recording area, during recording.

Figure 3A:
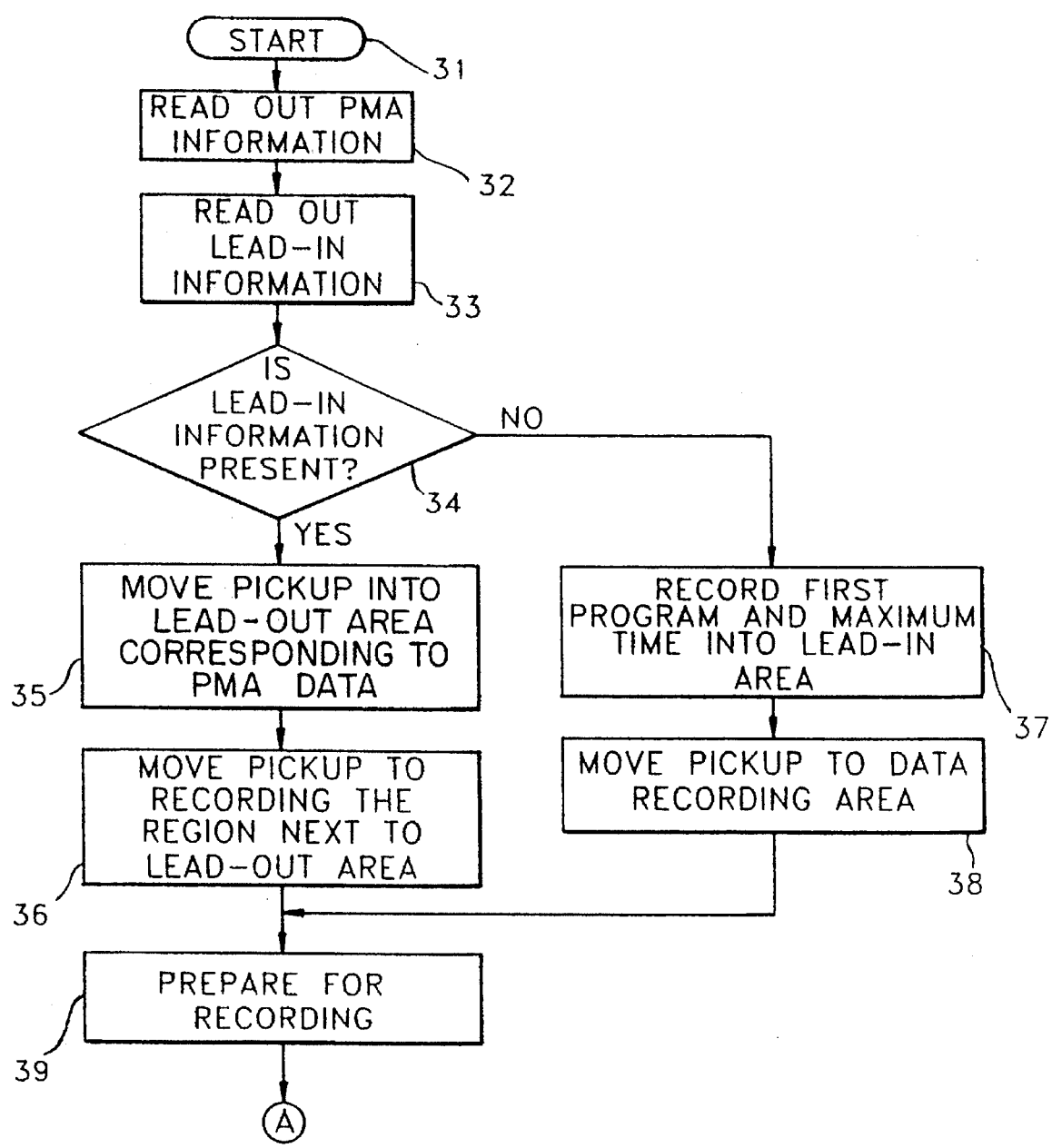
FIGS. 3A and 3B show a flowchart for explaining the recording method according to the present invention.
Figure 3B:
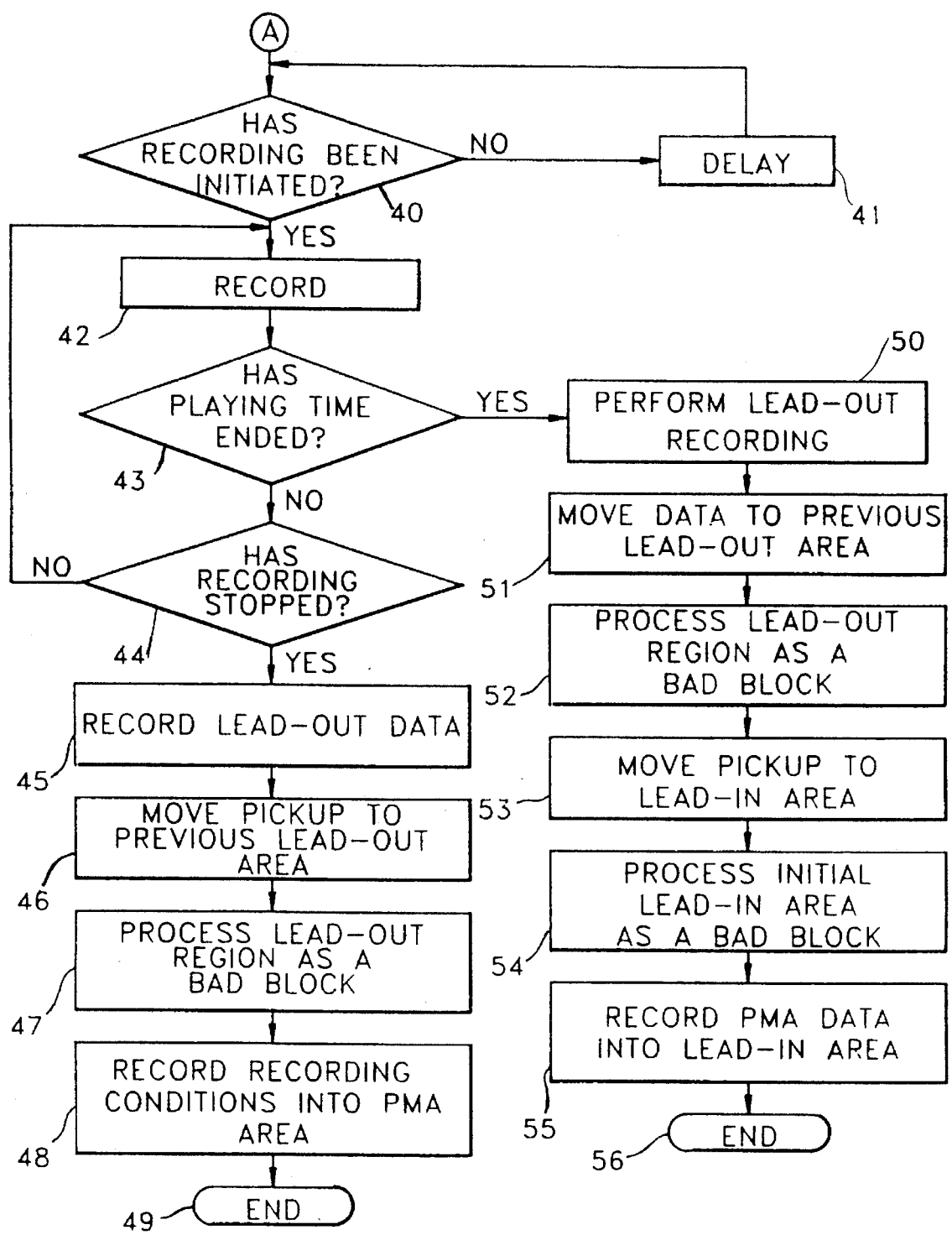

FIGS. 3A and 3B show a flowchart for explaining the recording method according to the present invention. With reference thereto, a controlling method is explained, which method overcomes the problem present in a conventional CD-WORM drive wherein the disc cannot be recorded on again after being formatted to be played. In a conventional CD-WORM drive which can record only once, the data can be played by a general CDP only when the data is initially recorded, and information concerning the recorded data is recorded on the lead-in area and the lead-out area indicates the end of the recording. With the present invention, however, prerecorded data on a CD-WORM disc can be played in another CDP, and later data can be recorded successively on the disc. The system control method will now be described.

When a recording/reproducing disc is mounted in the recording mode, the PMA information is read out in step 32, and then lead-in information is read out in step 33. After determining the presence or absence of lead-in information (step 34), as no such information would exist in the lead-in area of a new disc, the title of the first program and its maximum recording time are recorded on the lead-in area (step 37) if no existing lead-in information is present, which is followed by second pickup 17 being moved to the data recording area (step 38).

However, if lead-in information is present, meaning that the disc is a recorded disc, the pickup is moved to the end of the lead-out area (step 35), and then the pickup is moved to the area which is not recorded so as to be positioned next to the block where the lead-out is recorded (step 36). Then, the pickup stands by ready to record on the area positioned immediately outwards from the lead-out area, and the encoder 23 and laser diode modulator 22 are prepared for the recording operation (step 39).

Successively, the presence of a recording command is determined in step 40, and if there is no such command, the recording operation is delayed for 100 μs (step 41) before checking again. Upon the command of recording, recording is performed in step 42.

Next, it is determined whether the maximum recording time of the disc has been reached (step 43). If the maximum time is up, the lead-out is recorded on 150 blocks (for about 2 seconds) according to a predetermined format after the data recording step is ended (step 50), and then the pickup is moved to the previously recorded lead-out area (step 51) to remove the previously existing lead-out (step 52). Here, steps 51 and 52 perform the same function as steps 46 and 47 which will be explained in detail. After performing step 52, second pickup 17 is moved to the lead-in area (step 53), and then the lead-in area, where the data is initially recorded, is processed as a bad block (step 54). Successively, in step 55, the PMA data is recorded on the lead-in area next to the bad block area.

Meanwhile, before the end of the disc's maximum playing time, step 44 determines whether a recording stop signal is present, and if so, a lead-out is recorded in the next area after the data recording is ended in such a manner that the recorded lead-out is recorded on 150 blocks. In all of the above cases, after recording data, the data should be recorded on a new lead-out area of not less than one block with a recording time of 3 minutes or less. The pickup is moved to the location of the previously recorded lead-out, and then stands by in the block which is in front of a block where the lead-out is recorded (step 46). The preceding and following two blocks, including the recorded lead out, become bad blocks so that it is hard to extract a signal. This is for the recording of data over the previously recorded data by sending the maximum output from the laser modulator to the laser diode regardless of the signal from the encoder, thereby establishing a bad block. Successively, the location and time of the lastly recorded data are recorded into the PMA (step 48).

If a recording stop command has not been received, step 43 determines whether the disc playing time is up. If the maximum disc playing time is up, the recording completion steps 50 to 56 are performed. The steps for processing the lead-out area and the preceding and following blocks thereof, as well as the lead-in area and the preceding and following blocks thereof, as bad blocks, are performed by scanning the previously recorded area with the laser beam to record the data thereover, destroying the data's recording format.

Accordingly, since the dual disc recording/reproducing apparatus and the recording method can record an external audio signal and can also edit and record the audio signal of a compact disc using just one apparatus, its manufacture in a user-oriented form is made possible. In particular, digitizer 8, decoder 9, and D/A converting and amplifying unit 10 can be shared by the reproducing deck unit and the recording/reproducing deck unit, permitting the overall system structure to be simplified compared with that of a conventional system. Thus, the price is lowered, thereby enabling the apparatus to be used in the house as well as in the workplace.

Having described a preferred embodiment of the present invention, it will be clear to those skilled in the art that modifications and alternatives to the disclosed apparatus exist within the scope and spirit of the present invention. Accordingly, it is intended to limit the scope of the present invention only as indicated in the following claims.

What is claimed is:

1. A method for recording program data onto a disc using a recording/reproducing apparatus, the disc having a program memory area, a lead-in area, a data area and a lead-out area, said method comprising the steps of:

recording a title of a first program and a maximum playing time of said program on said lead-in area unless data is already recorded on the disc;

recording program data onto the next recording region after a previous lead-out area if data has been already recorded on the disc, and then recording a new lead-out area and processing said previous lead-out area as a bad block;

terminating data recording, recording a new lead-out area if the end of said maximum playing time has been reached during the recording of program data, and then processing previous lead-out area blocks including next blocks as bad blocks;

processing initial lead-in area blocks including next blocks as bad blocks; and recording data in said program memory area onto a new lead-in area.

2. A recording method as claimed in claim 1, wherein the step of recording a new lead-out area includes recording lead-out data on a new lead-out area of not less than one block and the recording time is not more than 3 minutes.

3. A recording method as claimed in claim 1, wherein said steps for processing the previous lead-out area blocks and for processing the initial lead-in area blocks include applying a laser beam to said initial and previous lead-in and lead-out areas, and then recording data so that a predetermined data-recording format is destroyed.

* * * * *